No. 891,953. PATENTED JUNE 30, 1908.
J. W. RICE & J. FULTON,
ANTITWISTING DRAFT MEANS FOR HARROWS AND THE LIKE.
APPLICATION FILED JAN. 14, 1908.

Jonathan W. Rice and
John Fulton
Inventors

Witnesses

By C. A. Snow & Co.
Attorneys

UNITED STATES PATENT OFFICE.

JONATHAN WILLIS RICE AND JOHN FULTON, OF KING CITY, MISSOURI.

ANTITWISTING DRAFT MEANS FOR HARROWS AND THE LIKE.

No. 891,953.     Specification of Letters Patent.     Patented June 30, 1908.

Application filed January 14, 1908. Serial No. 410,822.

*To all whom it may concern:*

Be it known that we, JONATHAN WILLIS RICE and JOHN FULTON, citizens of the United States, residing at King City, in the county of Gentry, State of Missouri, have invented a new and useful Antitwisting Draft Means for Harrows and the Like, of which the following is a specification.

This invention has relation to anti-twisting draft means for harrows and similar implements and it consists in the novel construction and arrangement of its parts as hereinafter shown and described.

The object of the invention is to provide a draft means of the character indicated which is adapted to be used in connection with a series or gang of listing or ditching harrows. The draft means is used to connect an individual harrow member with a draft bar which is employed in common for drawing all of the harrow members. The draft means is so constructed that the harrow may freely move vertically and horizontally but is held against axial movement whereby the draft means cannot become twisted and the harrow members cannot turn over.

Figure 1:
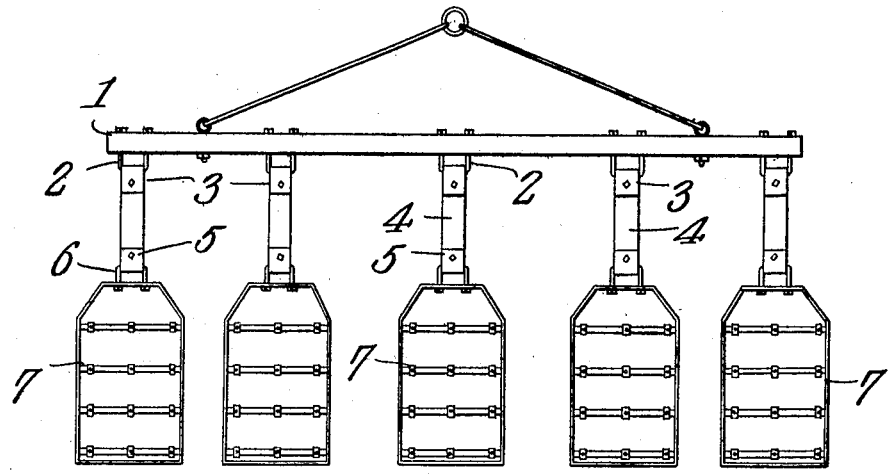
Figure 2:
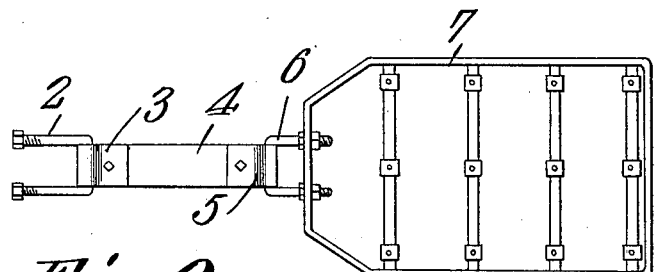

In the accompanying drawing: Figure 1 is a top plan view of a harrow provided with the draft means. Fig. 2 is a plan view of a detached harrow member provided with the draft means.

The harrow consists of the draft bar 1 which is provided at intervals with the horizontally disposed U-shaped irons or eyes 2. A loop 3 passes through each of the irons 2 and the forward end of the bar 4 is pivotally attached to the said loop. A loop 5 is pivoted to the rear end of each bar 4 and passes through a horizontally disposed eye or iron 6 which is attached to the forward end of the harrow member 7. By providing such a draft means it will be observed that the individual harrow members 7 may swing vertically and independently of each other and that they may also swing edgewise but that they are retained against any axial or twisting movement. Thus, the harrow members may be employed to list the soil at the opposite side of rows of plants and at the same time will have sufficient movement to follow the courses of the ditches without turning over.

Having thus described our invention, what we claim as new and desire to secure by Letters Patent is:

In combination with a draft bar and a harrow member, eyes attached to the bar and the harrow member, loops journaled upon the eyes and a bar pivotally connected at its opposite ends to the said loops.

In testimony that we claim the foregoing as our own, we have hereto affixed our signatures in the presence of two witnesses.

JONATHAN WILLIS RICE.
    JOHN FULTON.

Witnesses:
    T. W. COLLOW,
    J. S. FITE.